Jan. 20, 1970      P. M. CHRISTENSEN ET AL      3,491,268
BUS MOUNTING AND SUPPORT ASSEMBLY FOR ELECTRICAL
DISCONNECT SWITCHES AND THE LIKE
Filed Oct. 2, 1967                                2 Sheets-Sheet 2
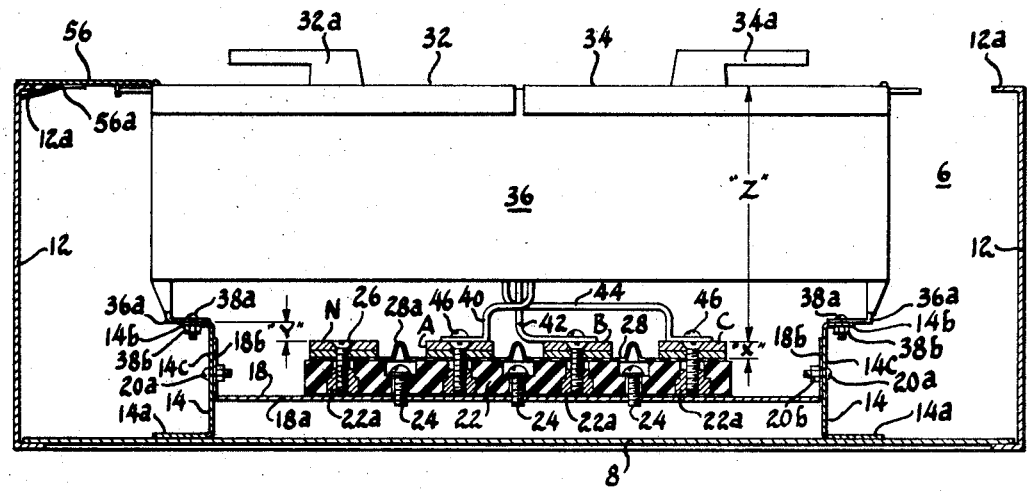
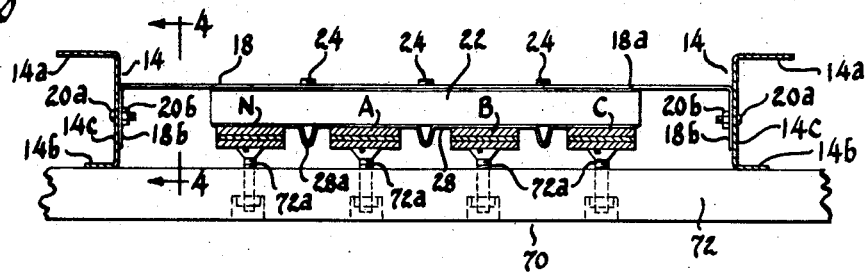
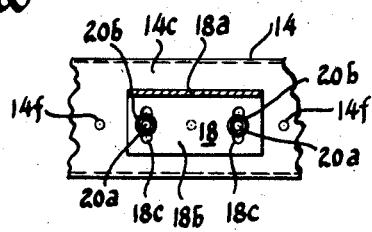
Inventors
Paul M. Christensen
Martin F. Koenig
By H.R. Ratter
Attorney

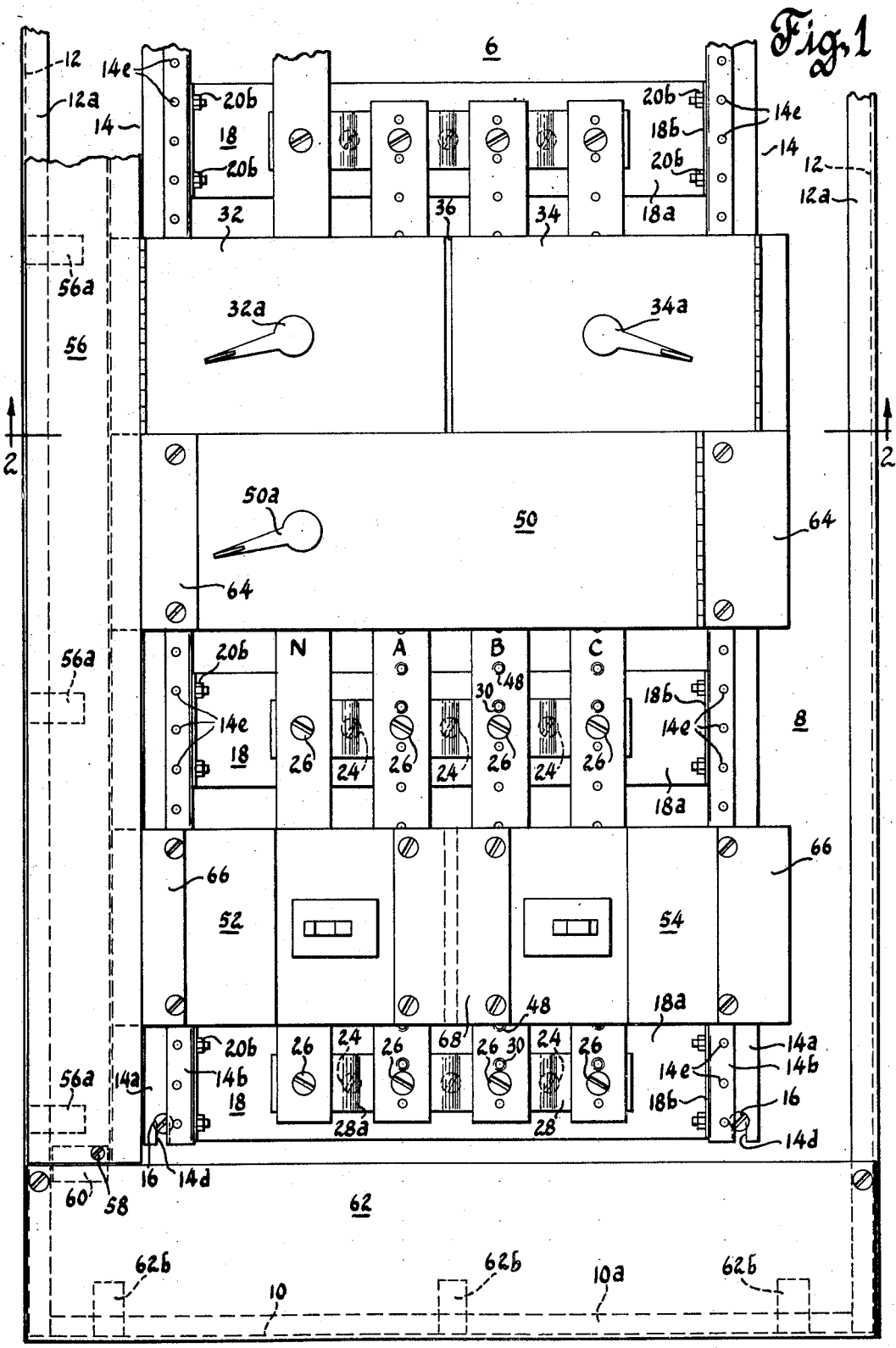

United States Patent Office 3,491,268
Patented Jan. 20, 1970

3,491,268
BUS MOUNTING AND SUPPORT ASSEMBLY FOR ELECTRICAL DISCONNECT SWITCHES AND THE LIKE
Paul M. Christensen, West Orange, N.J., and Martin F. Koenig, Milwaukee, Wis., assignors to Cutler-Hammer, Inc., Milwaukee, Wis., a corporation of Delaware
Filed Oct. 2, 1967, Ser. No. 676,991
Int. Cl. H04b 1/02
U.S. Cl. 317—119                                2 Claims

ABSTRACT OF THE DISCLOSURE

A bus bar mounting and support assembly is presented for electrical disconnect switches and the like for mounting in housings or enclosing cases and adaptable to several different ratings of switches. Parallel longitudinal rails have transverse channel shaped members initially loosely fastened therebetween at spaced intervals. Supply bus bars are secured to insulating blocks mounted on each channel shaped member. Fastener receiving openings in the legs of the channel shaped members are elongated so that when the assembly is next placed in a suitable dimension setting fixture the dimension between a surface of the bus bars and upper surface of a rail flange is automatically established. Subsequent tightening of the channel shaped member fasteners completes the assembly, and holds the aforementioned dimension fixed.

BACKGROUND OF THE INVENTION

It is common practice today to use a single size of housing or enclosing case to accommodate several different sizes or ratings of electrical disconnect switches or circuit breakers. Since the front-to-back dimension of the enclosing cases are normally fixed, and the depth of switches and circuit breakers and thickness of supply buses will vary according to the different ratings, the supporting structure mounted in the casing will vary in certain dimensions to properly accommodate the switches and circuit breakers to the particular casing or housing. An important or critical dimension that must be established and held when the mounting and supporting structure is mounted in the casing or housing is that between the upper surface of the bus bars and the front plane of the enclosing casing or housing. This is so in order to insure matching of the outer surfaces of mounted switches and circuit breakers with the front part of the casing or housing and any front closing filler strips or plates that may be used to cover vacant spaces.

It is desirable to maintain a certain depth dimension in constructing and assemblying the supporting and mounting structure which will enable establishing and maintaining the aforementioned critical dimension upon placement and securing the structure in place in the enclosing case or housing. As heretofore produced, it has been cumbersome and difficult to establish and maintain such certain dimension during the assembly of the bus bar mounting and switch supporting structure. Moreover, the usual manufacturing methods used do not permit easy change of such certain dimension when altering the structure to accommodate a different rating of switch or circuit breaker.

SUMMARY OF THE INVENTION

This invention pertains to a novel form of bus bar mounting and electric disconnect switch or circuit breaker support assembly and to a method of assembling and fixing a dimensional relationship between elements thereof during manufacture.

It is a primary object of the invention to provide a mounting and supporting assembly of the aforementioned type which can readily be used with several different sizes or ratings of disconnect switches and circuit breakers to facilitate their mounting in a housing or casing of a single size.

Another object of the invention is to use a form of dimension adjustment together with a method of assembly in connection with the aforementioned mounting and support structure that permits easy shifting of production sizing to meet the requirements of any of the contemplated switch or circuit breaker ratings when mounted in a single size of housing or enclosing case.

Other objects and advantages of the invention will hereinafter appear.

The accompanying drawings illustrate a preferred embodiment constructed in accordance with the invention and a method of constructing the same, it being understood that the embodiment illustrated is susceptible of modification without departing from the scope of the appended claims.

BRIEF DESCRIPTION OF THE DRAWINGS

FIGURE 1 is a fragmentary front view of an electrical panelboard with certain portions removed;

FIG. 2 is a sectional view taken along the line 2—2 of FIG. 1;

FIG. 3 illustrates a preferred apparatus for effecting dimensional adjustment of a portion of the structure of FIGS. 1 and 2; and FIG. 4 is a fragmentary view taken in the direction of the arrows 4—4 of FIG. 3.

DESCRIPTION OF THE PREFERRED EMBODIMENTS

With reference to the drawings, there is shown a substantially rectangular sheet metal box 6 having a back wall 8, an end wall 10 and side walls 12. The end and side walls have upper, inwardly extending flanges 10a and 12a, respectively.

Support rails 14 of the channel cross sectional form best shown in FIG. 2 are secured to the back wall 8 by bolts 16 extending through notches 14d in the opposite ends of the bottom flanges 14a. The rails 14 are provided along their upper flanges 14b with bolt receiving openings 14e that are spaced at uniform intervals throughout the length of the rails.

Channel members 18 having transverse webs 18a and upturned legs 18b, span the distance between the webs 14c of rails 14, and are secured in place by bolts 20a which penetrate elongated openings 18c in legs 18b and openings 14f spaced at regular intervals in the webs 14c. Nuts 20b taking on to the threaded ends of the bolts 20a secure the latter in place and clamp the legs 18b against and webs 14c.

An electrical insulating black 22 of generally elongated rectangular form is secured to the upper surface of the web 18a of each member 18. Screws 24 penetrate openings in the insulating blocks 22 and take into threaded openings in the webs 18a to secure blocks 22 in place. A neutral bus bar N, and two-piece, three-phase power bus bars A, B and C are spaced at equal distances across the members 22 and are secured thereat by screws 26 which penetrate alined openings in the bus bars and take into threaded inserts 22a molded in place in blocks 22.

Fiber insulating strips 28, having inverted V-shaped barrier portions 28a, are secured intermediately between each of the blocks 22 and the bus bars N, A, B and C. The barriers 28a increase the electrical creepage distance between the buses. Buses A, B and C are provided with threaded openings 30 at frequent equally spaced intervals therealong.

As shown in FIGS. 1 and 2, disconnect switches 32 and 34, having exterior operating handles 32a and 34a, respectively, are mounted in a single, double compartment box 36. Box 36 which is of a generally rectangular configuration has downwardly and inwardly extending mounting flanges 36a which seat on the inturned portions thereof along the upper surfaces of the flanges 14b of rails 14. Bolts 38a penetrate celarance opening in the flanges 36a, and alined openings 14e and take into nuts 38b to secure the box 36 in place on support rails 14. Conductor straps or lugs 40, 42 and 44, which may be assumed to connect interiorally of box 36 with each of the switches 32 and 34, are connected by screws 46, which take in threaded opening 48 formed at spaced intervals in each of the bus bars, to bus bars A, B and C, respectively.

FIG. 1 also shows a single disconnect switch 50 having an exterior operating handle 50a which may be assumed to be mounted on the rails 14 and electrically connected to bus bars A, B and C in a manner similar to that herebefore described for the box 36 of switches 32 and 34. Also shown in FIG. 1 are side-by-side mounted circuit breakers 52 and 54 which are respectively mounted at one side to a rail 14, and near their other side to pairs of bus bars by their electrical conducting straps or lugs.

As shown in FIGS. 1 and 2, front filler plates or strips 56 are secured to the upper surface of flanges 12a by spaced spring clip 56a which underlie the flanges 12a, and by screws 58 penetrating openings in the strip 56 and taking into a threaded opening in a tab 60 welded to the lower surface of a bottom filler strip 62. Strip 62 is secured by slips 62b underlying the upper flanges 10a of end wall 10 and screws which take down into threaded openings in flanges 12a.

Short filler plates 64 secured to the upper panels of switch 50 extend under panel strip 56 and abut against a downwardly extending flange portion to close any opening between the ends of the casing of switch 50 and strip 56. Other short filler strips 66 are secured to the ends of circuit breakers 52 and 54 casing and extend under the strip 56. A filler plate 68 is secured to the upper surfaces of the casing of circuit breakers 52 and 54. It will be apparent that if no disconnect switch is used in the vacant spaces between switch 50 and circuit breakers 52 and 54, or between the latter and end panel strip 62 that a suitable filler panel strip would be used to enclose such spaces against access from the front.

It is an important feature of the invention that the enclosing case box 6, support rails 14, channel members 18 and filler strips 56 and 62 can be used in making up panelboards accommodating circuit breakers and disconnect switches of a number of different standard ratings. As will be appreciated, the cross sectional thickness dimension "X" of the bus bars required to handle higher rated breakers and switches will increase. Likewise, the dimension "Y" from the upper surface of the bus bars to the upper surface of flanges 14b will be greater for higher rated breakers and switches than for those of a lower rating.

For a given standard rating of circuit breakers and disconnect switches the dimensions "X" and "Y" will be fixed. In th make-up of the disconnect switches or circuit breakers with their bus bar connecting straps the dimension "Z" will be fixed so that the front face of such switches or breakers, when attached to the flanges 14a and bus bars will have a desired relationship with the front plane of box 6.

In order that the dimension "Z" will be maintained and that switches or breakers can be secured to the flanges 14a and to the bus bars without undue difficulty, it is necessary that dimension "Y" during assembly of the bus bar mounting and switch supporting assembly be within acceptable limits.

In the preferable method of assembly, the channel members 18 are first loosely bolted to the rails 14 at desired points therealong. Next, insulating blocks 22 are secured to each member 18. The fiber insulating strips 28 are placed on each block 22 and the bus bars N, A, B and C secured on top of the strips 28.

The sub-assembly thus obtained is then placed on a jig or fixture 70 comprising a base 72, and adjustable stops 72a which are transversely and longitudinally spaced on the base 72 to engage with each of the bus bars. With each of the stops 72a, which in one preferred form comprise adjustable screws with flat heads, adjusted so that their outermost surfaces are the dimension "Y" above the surface of the base 72 when the dimension "Y" will be established from the outer surface of the bus bars to the outer surface of the flanges 14b. Then the bolts 20a and nuts 20b are tightened to secure the sub-assembly to the rails 14, to maintain the dimension "Y." When the thus obtained assembly is then placed inside the box 6 and the rails 14 are secured to the back panel 8 maintainence the dimension "Z" in a finished assembly to afford evenness of outer front surfaces of switches, breakers and filler plates will be greatly facilitated.

It will be seen from the foregoing that the limited adjustment of vertical mounting of members 18 with respect to the rails 14 serves two useful purposes. It permits ready adaptation of an enclosing case of one fixed front-to-back dimension to mounting of several different ratings of switches or circuit breakers together with attendant differences in cross section thickness of bus bars required. Additionally, it provides a convenient way of establishing and fixing an important dimension during assembly that insures evenness of front surface appearance.

While the foregoing invention has been described in application to a pre-formed, enclosing case or box, it will be appreciated that the invention is not limited in use or application to such type of housing. It can, for example, be used with housings formed partially by cavities in walls or the like, and having a preformed combination front access door and door frame overlying a portion of adjacent wall and wall cavity.

We claim:
1. A bus bar and supporting assembly for accommodating a plurality of different standard ratings of electrical switches and the like in a housing having a fixed front-to-back depth, comprising:
 (a) a pair of longitudinal rails having upper and lower mounting flanges and uniformly spaced alined openings in the web portion thereof;
 (b) a plurality of channel shaped members each having at least one elongated opening in each leg thereof spaced longitudinally between said rails;
 (c) insulating blocks secured to the web portion of each channel shaped member;
 (d) adjustable fasteners penetrating alined openings in the webs of said rails and the legs of said channel shaped members;
 (e) and at least one bus bar secured to said insulating blocks;
 (f) said fasteners and elongated openings in the legs of said channel shaped members affording adjustment of the latter to any number of positions between the flanges of said rails within the limit of the longitudinal dimension of said elongated openings to accommodate the assembly to differing bus bar thicknesses between the upper surfaces of said bus bars and the outer plane of a housing in which the assembly may be mounted.

2. The method of constructing and adjusting a bus bar and mounting assembly for electric switches and the like for use in housings having a fixed front-to-back dimension, comprising the steps of:
 (a) first arranging a pair of like, upper and lower flanged mounting rails in opposed, spaced and parallel alinement;
 (b) then loosely securing the legs of channel shaped members with adjustable fasteners to the opposed webs of said rails at spaced intervals therealong, said channel shaped members each having at least one elongated opening in each leg thereof to accommodate a fastener, said web having an insulating block secured thereto;

(c) then securing one or more bus bars to said insulating blocks on said channel shaped members;

(d) then placing the assembly on an adjusting fixture with the upper flanges of said rails bearing against a continuous plane surface of the fixture and the surfaces of any bus bars bearing against abutments extending a predetermined distance above the plane surface of the fixture;

(e) and then tightening the fasteners to simultaneously secure said channel shaped members to said rails and fix the dimension between the surface of any bus bar and the outer surface of the upper flanges of said rails to correspond with said predetermined distance.

References Cited

UNITED STATES PATENTS

| 1,788,567 | 1/1931 | Egger | 317—118 |
| 2,132,630 | 10/1938 | Jackson | 317—119 |
| 2,946,928 | 7/1960 | Slade | 317—119 |
| 3,217,090 | 11/1965 | Stegmaier | 317—119 |

FOREIGN PATENTS 616,792  8/1935  Germany.

LEWIS H. MYERS, Primary Examiner

GERALD P. TOLIN, Assistant Examiner

U.S. Cl. X.R.

317—112, 117